(12) United States Patent
Gasbarro (10) Patent No.: US 7,341,505 B1
(45) Date of Patent: Mar. 11, 2008

(54) BIRD WING CUTTING MACHINE

(75) Inventor: Geno N. Gasbarro, Columbus, OH (US)

(73) Assignee: Remington Holdings LLC, Columbus, OH (US)

( * ) Notice: Subject to any disclaimer, the term of this patent is extended or adjusted under 35 U.S.C. 154(b) by 0 days.

(21) Appl. No.: 11/605,868

(22) Filed: Nov. 29, 2006

(51) Int. Cl.
*A22C 21/00* (2006.01)
(52) U.S. Cl. ...................................... 452/169
(58) Field of Classification Search .............. 452/149, 452/166, 169, 170, 151, 150, 155; 198/867.11, 198/867.14, 803
See application file for complete search history.

(56) References Cited

U.S. PATENT DOCUMENTS

| | | | |
|---|---|---|---|
| 4,207,653 A | | 6/1980 | Gasbarro |
| 4,306,335 A | * | 12/1981 | Hawk et al. ................. 452/169 |
| 5,176,564 A | * | 1/1993 | Hazenbroek ................. 452/169 |
| 5,490,812 A | * | 2/1996 | Schaarschmidt ............ 452/138 |
| 5,496,210 A | | 3/1996 | Davis |
| 5,569,069 A | * | 10/1996 | Horst et al. ................. 452/169 |
| 5,618,230 A | * | 4/1997 | Bargele et al. ............. 452/169 |

* cited by examiner

*Primary Examiner*—Thomas Price
(74) *Attorney, Agent, or Firm*—Jason H. Foster; Kremblas, Foster, Phillips & Pollick (57) ABSTRACT

A machine for cutting poultry wings into segments. Holders convey wings through a guide that positions the first joint between the drumette and midwing. A blade incises the connective tissue after the bones at the joint have been disarticulated by lateral guides that form a tapered corridor. A second joint at the midwing and wingtip is forced into a pocket by one of the lateral guides extending into the second joint. The second joint is severed by a blade extending into the second joint from the side opposite the lateral guide.

13 Claims, 13 Drawing Sheets

BIRD WING CUTTING MACHINE

BACKGROUND OF THE INVENTION

1. Field of the Invention

This invention relates to a machine for separating the sections of a bird's wing rapidly without cutting into the bones.

2. Description of the Related Art

Domesticated birds (poultry) and wild birds are consumed in large numbers throughout the world. Bird processing machines are well known to increase the speed with which a bird carcass is turned into desirable cuts of meat. However, many cuts require manual manipulation of the carcass due to the complexity and variability of the carcass and the accuracy desired by those who purchase the cuts of meat.

Poultry wings can be prepared for eating from various cuts, most of which require one section of the wing to be separated from other sections. Separating bird wings into such cuts requires one to separate the three bones of the wing from one another by severing the muscle, skin and connective tissue on each bone. The drumette is the most muscular section of the wing and is attached at one end to the body. The wingtip is the least muscular and farthest from the body, and the midwing connects the drumette to the wingtip.

Some common ways of separating the three sections of the wing include manual cutting, which is slow and somewhat dangerous, and only as effective as the workers carrying out the method. Additionally, machines have been designed for separating poultry wings into their respective sections. U.S. Pat. No. 4,207,653 to Gasbarro and U.S. Pat. No. 5,496,210 to Davis, which are incorporated herein by reference, disclose machines for carrying out the separation process automatically. In the typical environment in which these machines are used, poultry carcasses are placed on holding structures and conveyed down an assembly line. Workers on the line cut whole wings off of each carcass and place the whole wings into one of the machines.

One disadvantage of prior art machines is their tendency to cut into the bones of the wings. Each bone is connected to an adjacent bone by connective tissue, such as skin, tendons and ligaments. In order to separate the sections of the wings in the most desirable manner, one separates the connective tissue between the bones without the blade or other cutting implement cutting into the bones. This is because cutting into the bone can result in bone shards that are undesirable.

Although they are faster and safer than cutting wings manually, prior art machines typically cut the bones in bird wings, thereby creating shards of bone that make the cuts undesirable. Therefore, the need exists for a machine that separates the sections of poultry wings efficiently and without forming shards.

BRIEF SUMMARY OF THE INVENTION

The invention is a cutting apparatus for cutting bird wings. Bird wings have a drumette segment, a midwing segment and a wingtip segment. The apparatus comprises a plurality of connected wing holders for receiving wings. Each wing holder has a central support for seating in a crotch of a first joint between the drumette and the midwing segments of the wing. A drive means, such as an electric motor, is drivingly linked to the connected wing holders for driving the wing holders through a path. A first guide is mounted above the path and has a groove, preferably facing downwardly toward the path. The groove receives, and restricts lateral and vertical movement of, the first joint. A pair of lateral guides are preferably mounted on opposite sides of the wing holders and have surfaces facing the wing holders. At least one of the surfaces taper toward the wing holders for guiding the drumette and midwing segments of a wing toward one another. The drumette and midwing segments are thereby pivoted around the central support, reducing the angle between the drumette and midwing and disarticulating the first joint.

A first blade preferably extends at least partially through the wing holders adjacent the groove and forms a gradually narrowing gap between the first guide and the first blade into which the first joint can be conveyed for separating the drumette and midwing segments of a wing. A tapered, upwardly-facing pocket is preferably formed in each wing holder adjacent the central support. A second joint between the midwing and wingtip segments of a wing can be disposed in this pocket. One of the lateral guides is preferably mounted in the path and extends toward the pocket for extending into the crotch of the second joint and restricting lateral and vertical wing movement. A second blade extends at least partially through the wing holders adjacent said one of said lateral guides and forms a gradually narrowing gap between said one of said lateral guides and the second blade. The second joint is conveyed into the gap by a corresponding wing holder for separating the midwing and wingtip segments of a wing.

The apparatus preferably has a first slot in the central support of the wing holder into which the first blade extends, and a second slot in the wing holder into which the second blade extends. Still further, the first and second blades are preferably stationary.

The invention thus separates the three parts of a bird wing from one another, and does so rapidly, safely and without creating bone fragments.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 1:
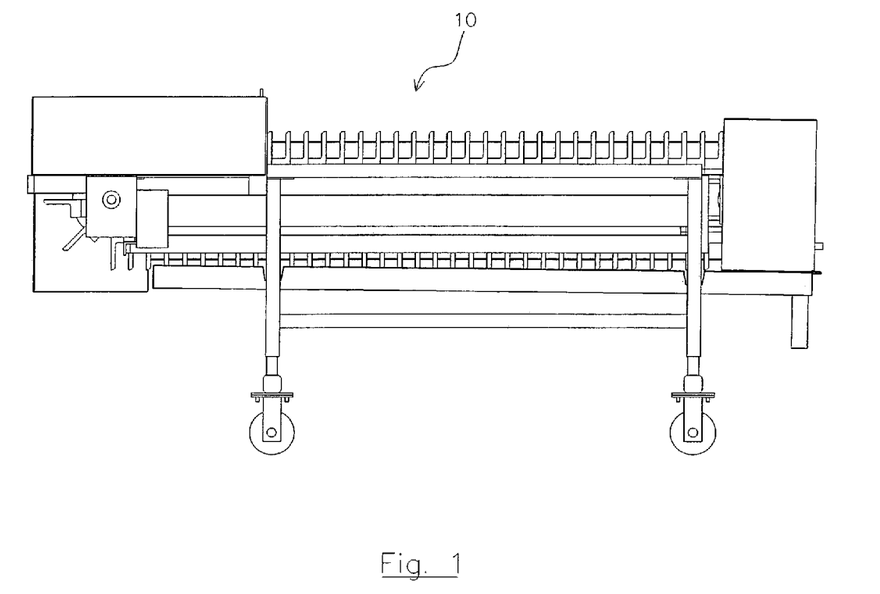
FIG. 1 is a side view illustrating a machine built according to the present invention.
Figure 2:
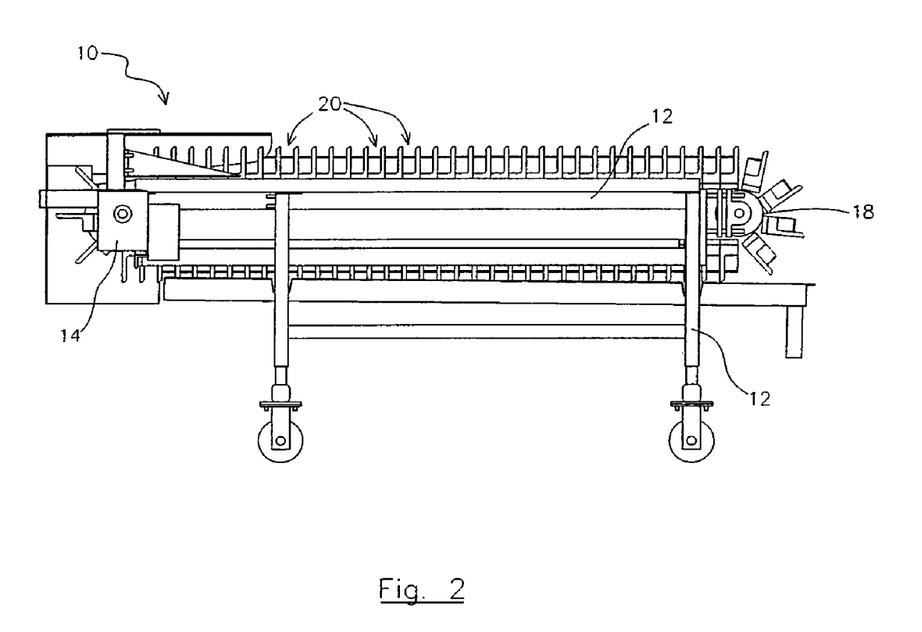
FIG. 2 is a closer side view illustrating the machine of FIG. 1 with the protective shields removed to make the underlying parts visible.

In FIG. 1, the preferred machine 10 is shown with a plurality of shields and other safety equipment in place to protect those who work around the machine 10. The machine 10 is shown in FIG. 2 with the shields removed for better visibility. Of course, during operation the shields and protective equipment would be in place as shown in FIG. 1, but these components have been removed for the sake of describing the underlying components.

The machine 10 has a rigid, preferably steel, frame 12 which supports the components of the machine 10. One of the components of the machine 10 is a motor 14 that serves as a drive means as described in more detail herein. The motor 14 is preferably an electric motor, such as a servo motor, but could be substituted by a hydraulic or pneumatic motor or any other prime mover as will be understood by the person having ordinary skill in the art. The motor 14 could also, for example, have a gear reduction or a frequency drive to allow the speed that it is driven to be adjusted.

As illustrated in FIG. 2, a plurality of wing holders 20 are mounted at their bases to a chain 18 that forms a continuous loop around the frame 12 and is driven by a gear on the motor 14. The wing holders 20 are thus driven in the manner of a conveyor belt around the machine 10. The wing holders 20 carry bird wings through a region of the machine 10 that the wings traverse during normal operation of the machine 10, which region is referred to herein as the path of the machine. The wing holders 20 on the upper span of the chain 18 preferably move in one direction, from an "upstream" position toward a "downstream" end of the machine 10, which is the right end in the illustration of FIG. 2. Of course, if a wing is stuck or for some other reason, the chain 18 can be driven backwards. During normal operation, once a wing holder 20 leaves the path in which the wings are cut, the holder 20 is driven beneath the machine 10 (at the right end) and then is raised upwardly at the left end in FIG. 2. Thus, the wing holders 20 traverse a continuous path around the machine 10 for a continuous wing cutting operation.

Figure 3:
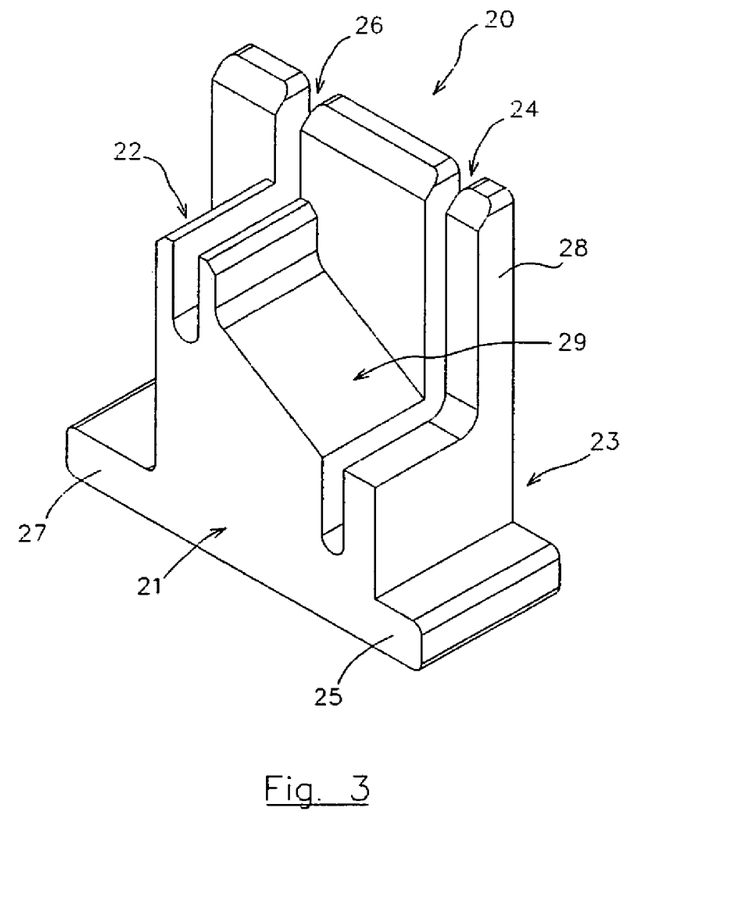
FIG. 3 is a view in perspective illustrating a holder of the present invention.

The wing holder 20, shown in detail in FIG. 3, has a front surface 21 and a rear surface 23, both of which are planar and parallel to one another in order that each holder 20 can seat against complementary surfaces on adjacent wing holders 20 when the holders 20 are aligned parallel to one another. This cooperation causes each holder 20 to support the next adjacent holder 20 when a load is applied to the holders, as described in more detail below, thereby maintaining each holder upright. The ears 25 and 27 at the base of each holder 20 are mounted to the drive chain 18 or other similar structure that is driven by the motor 14, such as belts and pulleys.

Each wing holder 20 has a central support 22 that supports the joint between the drumette and the midwing that is placed in the machine. The central support 22 has a slot 26 formed therein through which a blade can extend as the holder 20 traverses the path through the machine 10. Another slot 24 is formed in the holder 20 for another blade and a guide, as described below, to extend. The holder 20 is preferably made of food grade plastic, such as that sold under the trademark DELRIN, but could be made of stainless steel or any other suitable material.

Figure 4:
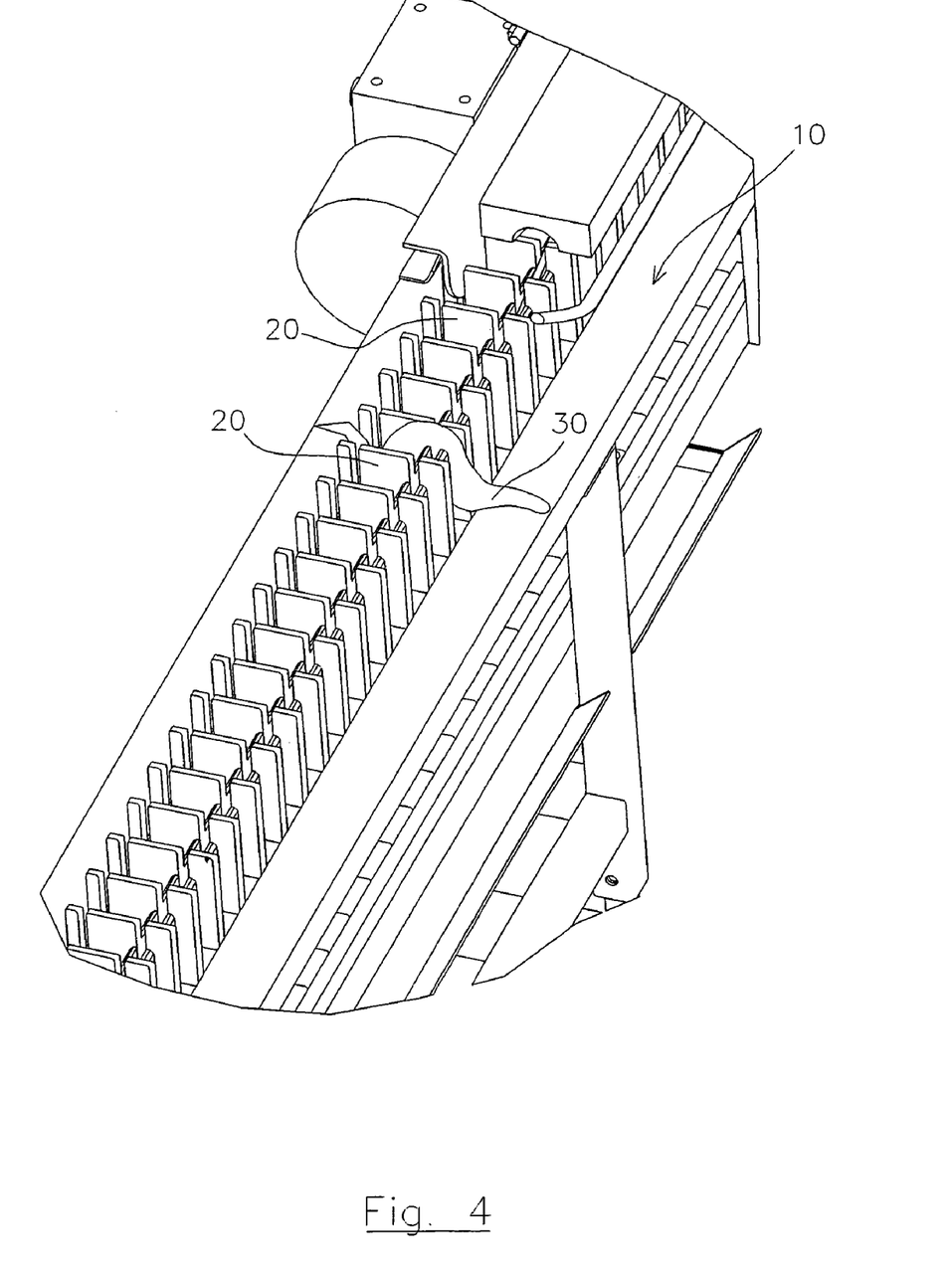
FIG. 4 is view in perspective illustrating the machine of FIG. 1 with a turkey wing in an operable position.
Figure 6:
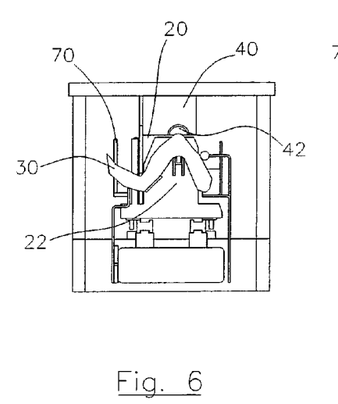
FIG. 6 is a schematic end view illustrating a bird wing in an operable first position in the present invention.

In FIG. 4, the machine embodying the present invention is shown with the wing holders 20 aligned along the top of the machine, and a single bird wing 30 loaded in an operable position therein. The wing 30 is loaded with the central support 22 seated in the crotch of the first joint, which is the joint where the drumette and midwing join. This joint and the relative position of the central support 22 can more readily be seen in FIG. 6, which is a schematic view of the wing holder 20 showing the wing 30 on the central support 22.

Figure 5:
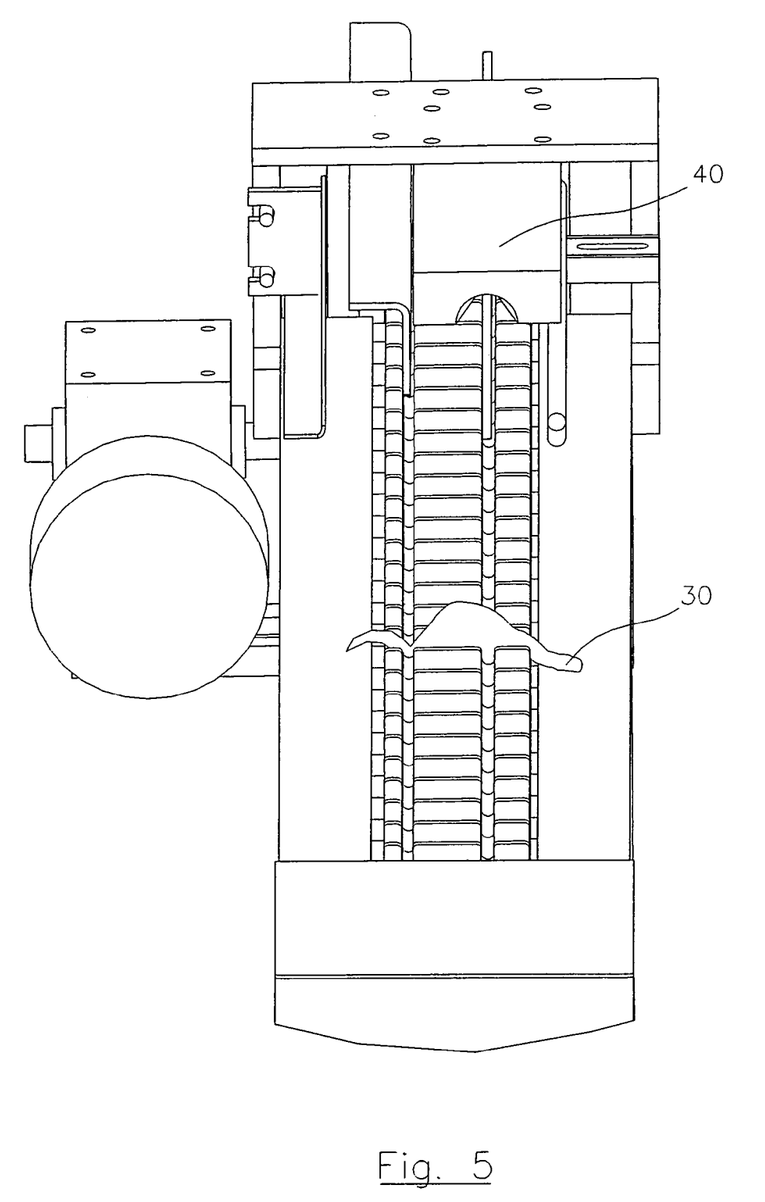
FIG. 5 is an end view illustrating a turkey wing in an operable position.
Figure 13:
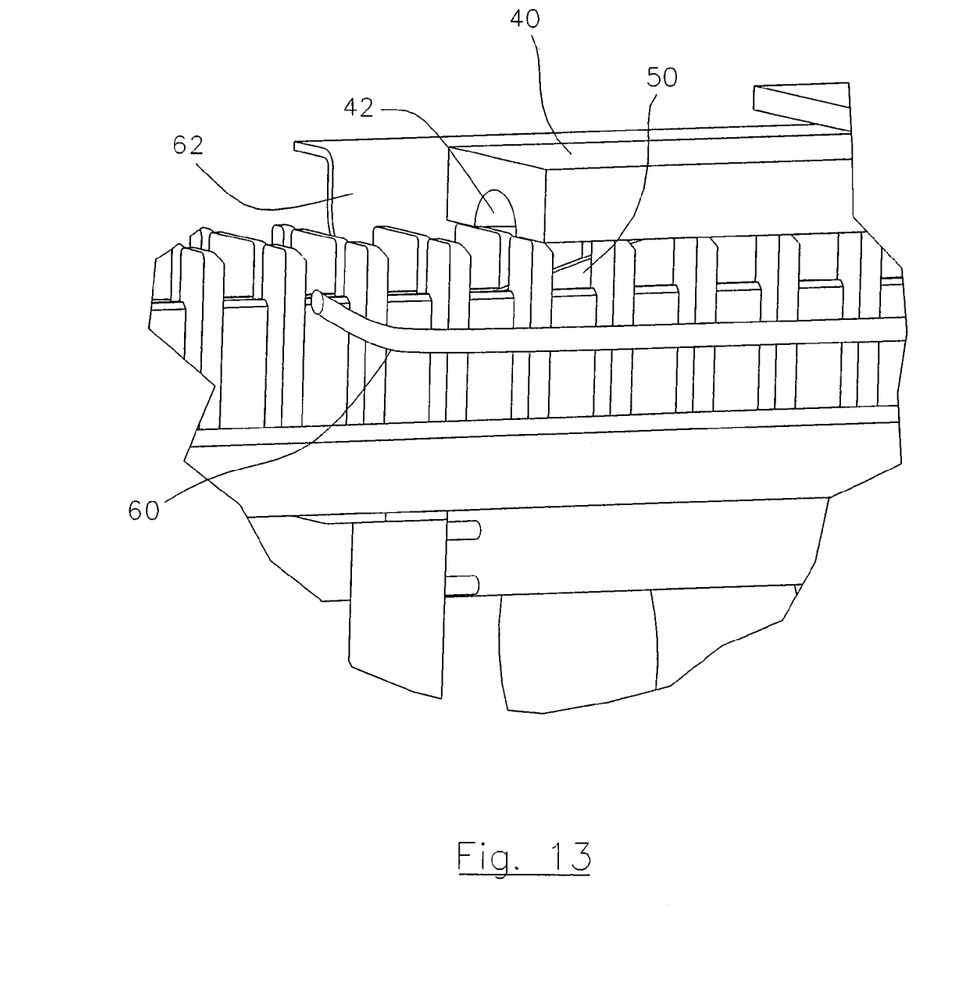
FIG. 13 is a view in perspective illustrating a closer view of a blade and guide in which the wing is first cut between the drumette and midwing.
Figure 14:
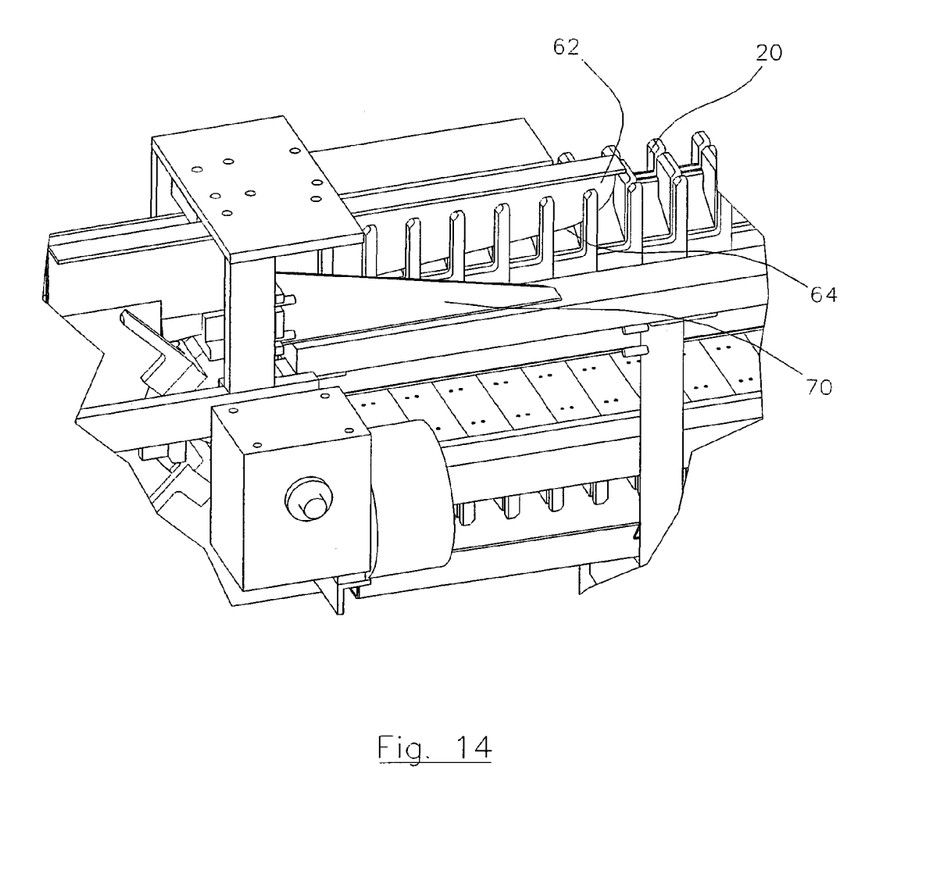
FIG. 14 is a view in perspective illustrating a closer view of a guide that guides the wing tip upwardly as the second cut is made.
Figure 15:
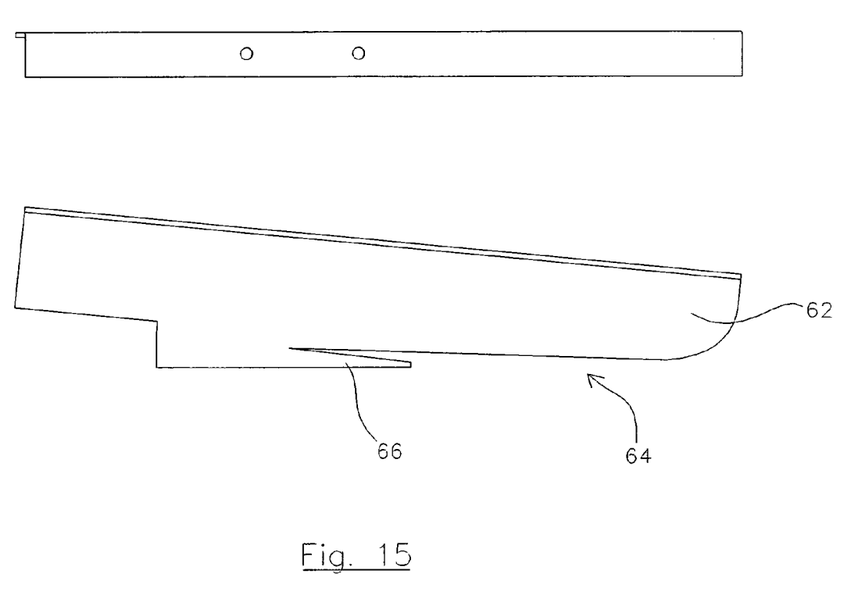
FIG. 15 is a side view illustrating the guide and blade, apart from the remainder of the machine in which it is mounted in an operable position, that forms the second cut.

After being loaded onto the machine, the wing 30 is driven along the path toward the parts of the machine 10 that make the first cut and which are shown more clearly in FIGS. 5 and 13. There is a knuckle-block guide 40 mounted adjacent the path through which the wings progress, and which is preferably directly above the wing holders 20 with a preferably circular cylindrically shaped groove 42 formed along its length and preferably opening downwardly toward the holders 20. The guide 40 is preferably made of DELRIN brand food grade plastic, but could be any suitable material. The outer tip (knuckle) of the first joint seats against the sidewall of the groove 42 as the wing holders 20 are driven along the path for aligning the joint precisely in the machine 10. This precise alignment is critical for the operation of the machine, and accounts for some of its unique accuracy.

As shown in FIG. 13, a first blade 50 is mounted beneath the guide 40, directly aligned with the groove 42, with its sharp edge facing toward the groove 42. The blade 50 is preferably mounted in a stationary position without the ability to be adjusted, so that it can only extend through the slot 26 of each holder 20 as the holders are driven along the path. The upwardly-facing sharp edge of the blade 50 is angled relative to the axis of the groove 42 to provide a gradually narrowing gap between the groove 42 surface of the guide 40 and the sharp edge of the blade 50 as a wing progresses downstream.

Thus, as the first joint is aligned in the groove 42 and progresses downstream, the joint is aligned by the guide 40, central support 22 and other components of the machine 10 to intersect the blade 50 at the precise location desired. This is due to the registration of the joint in the groove 42, and the relative position of the blade 50 to the groove 42. The machine 10 thereby positions the joint of any sized wing in alignment with the blade that incises through the joint as discussed below.

Figure 7:
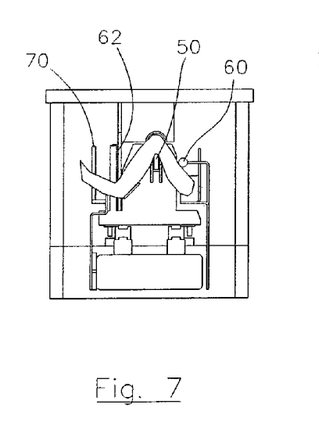
FIG. 7 is a schematic end view illustrating a bird wing in an operable second position in the present invention as a first cut is begun.

The drumette and midwing that form the first joint between their adjacent, proximal ends have opposite, distal ends that are gradually compressed together as the wing progresses along the path. This compression is accomplished by a pair of guides 60 and 62, shown in FIGS. 6-16, that form a tapered corridor in the machine 10 on opposing lateral sides of the path. The ends of the drumette and midwing that are distal from the first joint seat against these guides 60 and 62 as shown in FIG. 7. As the wing 30 is conveyed further downstream, the surface of at least one of the guides 60 and 62 compresses the ends of the drumette and midwing toward one another. This compression of the wing is caused by a surface that tapers toward the holder 20, or that tapers downwardly, thereby decreasing the angle between the drumette and midwing, as described below. Because the central support 22 acts as a fulcrum around which the sections of the wing pivot, the structures of the machine 10 cause the joint to open up during this compression.

By interposing the central support 22 between the drumette and the midwing, and then forcing the joint into the groove 42, the position of the joint is positively located and limited to a particular region of the machine 10. Once the ends of the drumette and midwing begin to compress toward one another, the decreasing angle therebetween, and the interposed central support 22, cause the drumette and midwing to pivot about the central support 22, thereby disarticulating the first joint without severing any of the connective tissue. The first joint is disarticulated rather than the segments of the joint merely being angled more acutely, because the central support 22 occupies the space that the drumette and midwing would have to occupy in order to be merely angled more acutely, which forces the two bones apart at the joint and places the connective tissue in tension.

Figure 8:
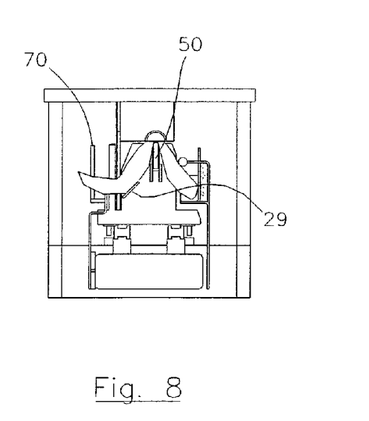
FIG. 8 is a schematic end view illustrating a bird wing in an operable third position in the present invention as the first cut is completed.

Once the joint is substantially disarticulated, there is a larger space between the bones into which a knife blade can be inserted and avoid striking either bone. The machine 10 is designed to bring the wing 30 into contact with the blade 50 and sever the connective tissues which are under tension at the point of incision. This is shown in FIGS. 7 and 8. Because the connective tissue is under tension, it can be severed easily, thereby allowing the joint to disarticulate even further as the tissue is severed. The drumette and midwing are thus separated (as shown in FIG. 8) with no bone fragments being formed, because of the gap that is formed between the bones of the joint prior to cutting through the joint. This allows the blade to contact only connective tissue, not bone, because the bones are pulled far apart by the time the blade begins to incise the skin.

The width of the slot 24 is preferably slightly larger than the thickness of the guide 62. Because the holder 20 is driven along a straight line, and because the guide 62 extends in the slot 24 on the holder 20, the guide 62 must be oriented parallel to the longitudinal line of travel that the holder 20 traverses. Of course, this would not be necessary if the holder 20 or its drive means is modified so that the holder does not travel in a straight line. Additionally, if the slot 24 is modified to be substantially wider than the guide's thickness, the guide 62 can be oriented at an angle to the direction of travel.

Similarly, the blade 50 is aligned with the slot 26 in the holder 20 substantially parallel to the holder's line of travel. And similarly, this could be modified if the slot 26 is substantially wider than the blade's thickness.

Figure 16:
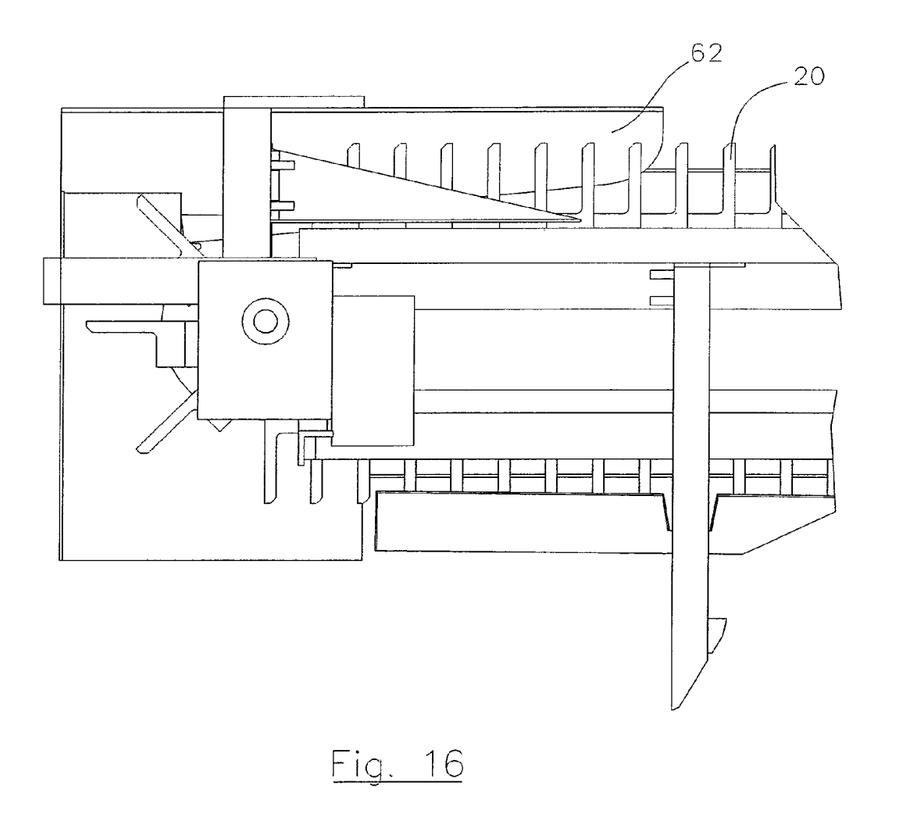
FIG. 16 is a close side view illustrating the machine of FIG. 1 with the protective shields removed to make the underlying parts visible.
Figure 17:
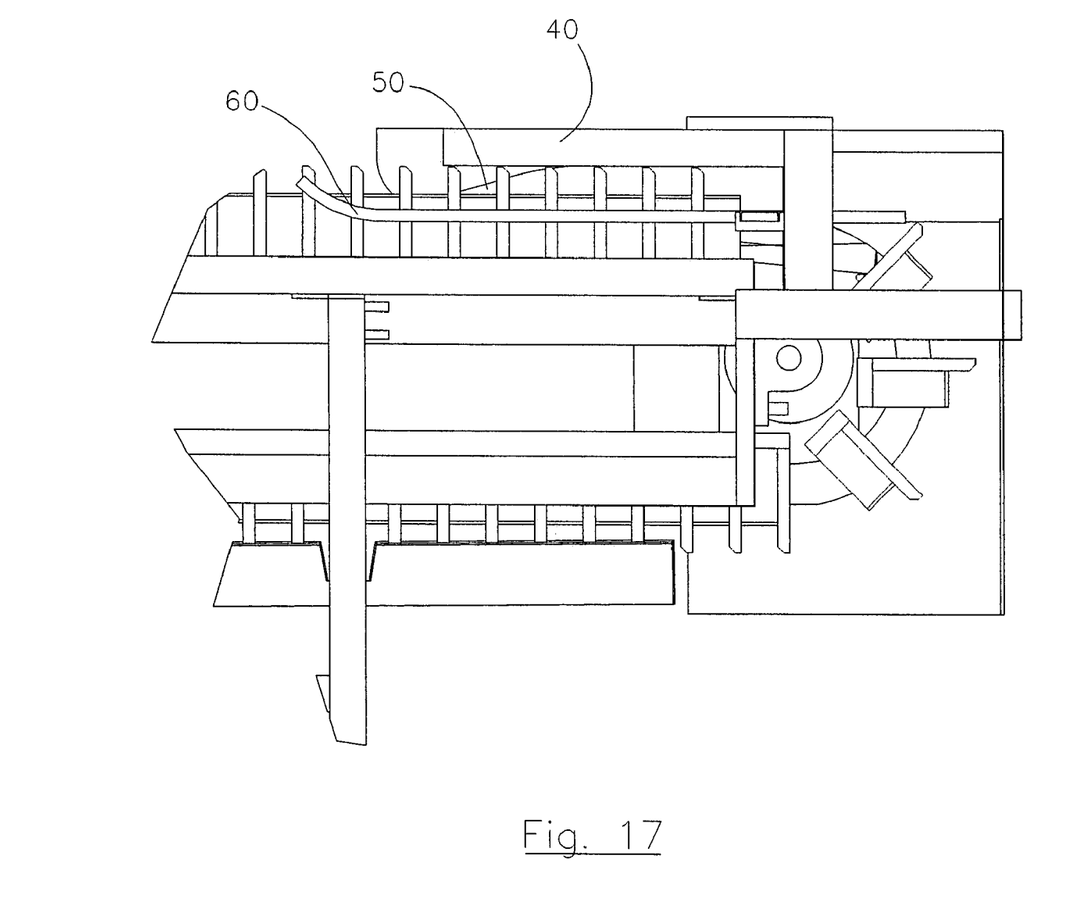
FIG. 17 is a close side view illustrating the machine of FIG. 1 from the side opposite that shown in FIG. 16.

The drawings illustrate one embodiment of the tapered corridor formed in the machine. In FIG. 16, the guide 62 is shown having a lower surface that is tapered downwardly as the guide 62 progresses downstream. This lower surface forces one of the segments of the wing downwardly as the wing is advanced through the path. The lower surface of the guide 60 similarly tapers downwardly, as shown in FIG. 17, thereby forcing the other of the segments of the wing at the first joint downwardly. These two tapered surfaces force the two segments of the joint to pivot about the joint around the central support 22, thereby compressing the joint as the wing progresses downstream. These two tapered surfaces form the tapered corridor described above.

Figure 18:
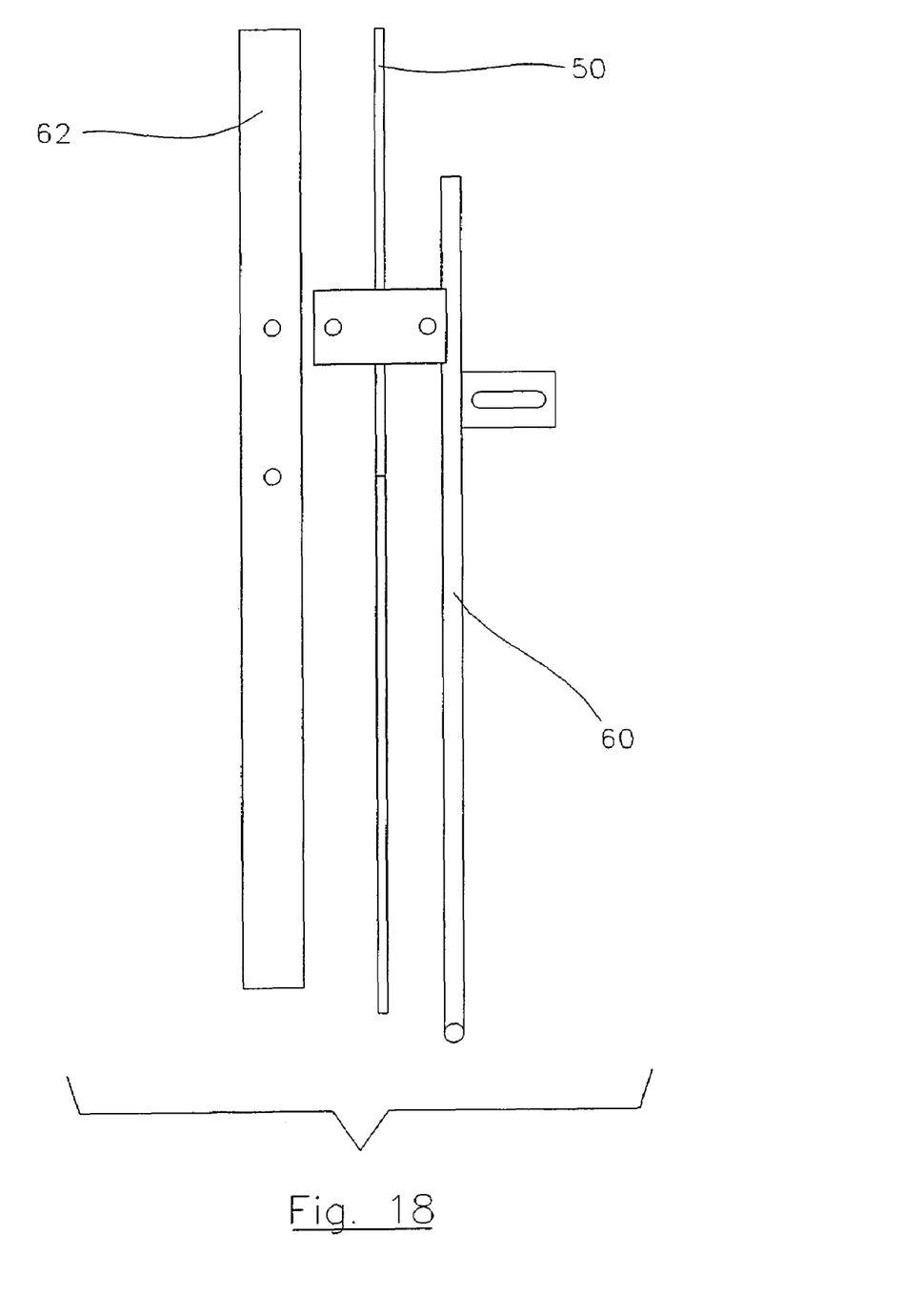
FIG. 18 is a schematic top view illustrating the lateral guides.

The guide 60 is shown in FIG. 18 relative to the blade 50 and the guide 62, illustrating that the three structures are substantially parallel to one another. Of course, one alternative tapered corridor is one in which the inwardly facing surface of the guide 60 is tapered toward the guide 62, instead of, or in addition to, tapering the surface downwardly. By tapering the guide 60 toward the guide 62 along the downstream end of the guide 60, the segment of the wing that contacts the inwardly tapered surface will be forced inwardly. Because the inward movement of the wing segments causes compression of the wing, this alternative embodiment has a similar result to the preferred embodiment. The result is similar because the wing segments pivot about the joint whether they are forced downwardly or inwardly. The combination of structures illustrated causes the wing 30 that is placed in the holder 20 and conveyed through the path to encounter a tapered corridor between the guides 60 and 62 that compresses the wing as it progresses downstream in the path.

The central support 22 on each wing holder could be replaced by a central rod around which the wing holders move. The central support can be positioned in the joint between the drumette and the midwing to replace the central support 22.

In a preferred embodiment, there are small indentations (not shown) on the blade 50 so that the joint's components have pressure on them that varies while the joint is driven down the path. This varied pressure allows the joint to "seek" the correct position relative to the blade. This is designed to be the lowest energy state, which is where the joint is shown in FIG. 7. The indentations cause slight side motion of the joint as its components drag against the blade so the blade can settle into the joint.

The blade 50 is preferably not so sharp that if it were to strike a bone it would cut a groove in the bone and stay in that groove as the wing 30 is driven along the path. Instead, the blade 50 is preferably sharp enough to sever skin and other connective tissue cleanly, but "dull" enough that it will scrape along any bone that it comes into contact with, so that the blade can be driven to the lowest position in the joint between the bones. Because the skin and other connective tissue are under tension, the blade 50 can easily cut through without being extremely sharp.

Figure 9:
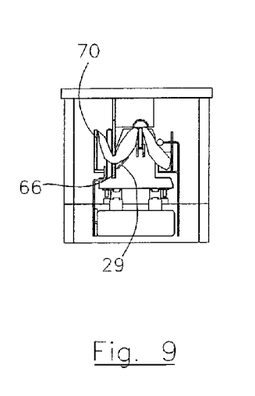
FIG. 9 is a schematic end view illustrating a bird wing in an operable fourth position in the present invention as the wing is position for a second cut.

As the cut in the first joint is being made, the still-connected combination of the midwing and the wing tip is being captured in a pocket of the wing holder 20 as shown in FIG. 9. When the first cut is complete, the combination of the midwing and the wingtip can fall into the pocket to align the second joint, which is the joint between the midwing and the wingtip, with another blade. The pocket is designed so that even the largest wings will have room to fall down after the first cut is made. The pocket is formed by the pocket sidewall 29 (see FIG. 3) on the wing holder 20 and the guide 70 shown in FIG. 14 (in which many parts have been removed in order to show the relevant underlying structures).

Figure 10:
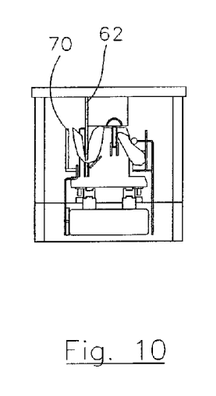
FIG. 10 is a schematic end view illustrating a bird wing in an operable fifth position in the present invention as the second cut is begun.
Figure 11:
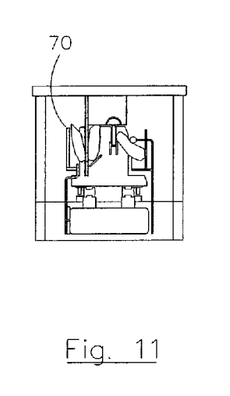
FIG. 11 is a schematic end view illustrating a bird wing in an operable sixth position in the present invention as the second cut is completed.

As the wing progresses downstream, it is driven further into the pocket (as shown in FIG. 10) by the guide 62 that seated against the midwing during the first cut and that extends through the slot 24 of each holder 20. The guide 62 has a lower surface 64 that is tapered toward the pocket into which the wing is driven as the wing progresses downstream, thereby seating in the crotch of the second joint and forcing the combination of the midwing and wingtip all the way down into the pocket as shown in FIGS. 9 and 10. This positively locates the second joint for an incision with a second blade 66 (see FIG. 9).

Figure 12:
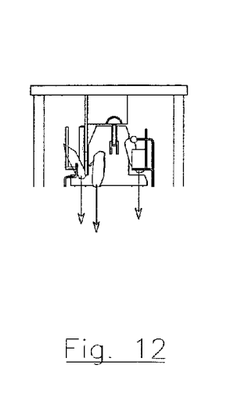
FIG. 12 is a schematic end view illustrating a bird wing in an operable seventh position in the present invention as the sections of the wings are separated to fall downwardly into containers.

Immediately before the second joint is cut, the wingtip is engaged by the ramp-shaped upper surface (see FIG. 14) of the guide 70 that causes the end of the wingtip to pivot toward the midwing, and then fold behind the guide 70 on which the ramp is formed. The pole 28 on the holder 20 supports the wing tip in a longitudinal direction of travel of the wing 30, so that the wingtip is held in position during cutting. The pole 28 prevents the wingtip from moving longitudinally relative to the holder 20 while the wingtip is being separated from the midwing. The pole 28 is the portion of the holder 20 that is between the guide 70 and the guide 62 that pushes the wing tip along the path. While the guide 70 brings the wingtip toward the midwing, lateral movement of the wingtip is restricted by the guide 70, and lateral movement of the midwing is restricted by the surface 29. The pocket also retains the wingtip after it is separated from the midwing as shown in FIG. 12.

The guide 62 is preferably rigidly mounted to the blade 66 with the blade 66 having a sharpened edge facing upwardly, and forming a gradually narrowing gap between the edge 64 and the blade 66. The blade 66 also extends through the slot 24 in each of the holders 20 in the path. Thus, as the second joint progresses through the gap, the guide edge 64 positively locates and strains the second joint, and the blade 66 severs the skin and other connective tissue from the side opposite the edge 64. This again opens the joint to incise the connective tissue without striking bone.

Once the first and second joints are separated, the holders 20 begin to progress around the curved part of the drive means at the extreme ends of the machine. Thus, the parts of the wing fall out as the holders 20 separate and tilt downwardly, as shown in FIG. 12. These wing parts are preferably guided by chutes or other structures into containers, such as pans, buckets, boxes or any other container.

It is contemplated that the machine can be used to make only one cut through the wing, rather than two. Thus, one can cut only the drumette from the midwing, but not the wingtip from the midwing. Alternatively, one can only cut the wingtip from the midwing, but not the midwing from the drumette. This can be accomplished by removing one of the blades.

While certain preferred embodiments of the present invention have been disclosed in detail, it is to be understood that various modifications may be adopted without departing from the spirit of the invention or scope of the following claims.

The invention claimed is:

1. A cutting apparatus for cutting bird wings having a drumette segment, a midwing segment and a wingtip segment, the apparatus comprising:
   (a) a plurality of connected wing holders for receiving wings, each wing holder having a central support for seating in a crotch of a first joint between the drumette and midwing segments of a wing;
   (b) means for moving the wing holders through a path;
   (c) a first guide mounted adjacent the path and having a groove facing the path for receiving the first joint of a wing and restricting movement of the first joint away from the wing holder;
   (d) a pair of lateral guides mounted adjacent the path on opposing sides thereof, the lateral guides forming a tapered corridor for guiding the drumette and midwing segments of a wing toward one another, thereby pivoting the drumette and midwing around the central support, reducing an angle between the drumette and midwing and disarticulating the first joint;
   (e) a first blade mounted in the path adjacent the groove, and a gap positioned between the first guide and the first blade into which the first joint can be conveyed by a corresponding wing holder, the first blade separating the drumette and midwing segments of a wing.

2. The apparatus in accordance with claim 1, further comprising:
   (a) a pocket in each wing holder into which a second joint between the midwing and wingtip segments of a wing can be disposed;
   (b) one of said lateral guides being mounted in the path for extending into the crotch of the second joint and restricting wing movement away from the pocket;
   (c) a second blade mounted in the path adjacent said one of said lateral guides and a gap positioned between said one of said lateral guides and the second blade into which the second joint is conveyed by a corresponding wing holder for separating the midwing and wingtip segments of a wing.

3. The apparatus in accordance with claim 2, further comprising a first slot in the wing holder into which the first blade extends.

4. The apparatus in accordance with claim 2, wherein the slot is formed in the central support.

5. The apparatus in accordance with claim 3, further comprising a second slot in the wing holder into which the second blade extends.

6. The apparatus in accordance with claim 5, wherein the pocket is formed by a surface of the wing holder and a wingtip guide.

7. The apparatus in accordance with claim 6, wherein the wingtip guide has a ramp-shaped edge.

8. The apparatus in accordance with claim 7, wherein the groove faces downwardly.

9. The apparatus in accordance with claim 8, wherein the first and second blades are mounted to a stationary object.

10. A cutting apparatus for cutting bird wings having a drumette segment, a midwing segment and a wingtip segment, the apparatus comprising:
    (a) a plurality of connected wing holders for receiving wings, each wing holder having a central support for seating in a crotch of a first joint between the drumette and the midwing segments of a wing;
    (b) a drive motor linked to the connected wing holders for moving the wing holders through a path;
    (c) a first guide mounted above the path and having a groove facing downwardly toward the path, the groove adapted to receive the first joint of a wing and restricting lateral movement and vertical movement of the first joint away from the wing holder;
    (d) a pair of lateral guides mounted on opposite sides of the connected wing holders and having surfaces facing the connected wing holders, at least one of the surfaces tapering for guiding at least one of the drumette and midwing segments of a wing toward one another, thereby pivoting at least one of the drumette and midwing around the central support, reducing the angle between the drumette and midwing and disarticulating the first joint;

(e) a first blade extending at least partially through the connected wing holders adjacent the groove and forming a gradually narrowing gap between the first guide and the first blade into which the first joint can be conveyed by a corresponding wing holder for separating the drumette and midwing segments of a wing;

(f) a tapered, upwardly-facing pocket in each wing holder adjacent the central support and into which a second joint between the midwing and wingtip segments of a wing can be disposed;

(g) one of said lateral guides mounted in the path and extending toward the pockets for extending into the crotch of the second joint and restricting lateral and vertical wing movement;

(h) a second blade extending at least partially through the connected wing holders adjacent said one of said lateral guides and forming a gradually narrowing gap between said one of said lateral guides and the second blade into which the second joint is conveyed by a corresponding wing holder for separating the midwing and wingtip segments of a wing.

11. The apparatus in accordance with claim 10, further comprising a first slot in the central support of the wing holder into which the first blade extends, and a second slot in the wing holder into which the second blade extends.

12. The apparatus in accordance with claim 11, wherein the pocket is formed by a surface of the holder and a wingtip guide, wherein the wingtip guide has a ramp-shaped edge.

13. The apparatus in accordance with claim 12, wherein the first and second blades are mounted to a stationary object.

* * * * *